July 7, 1942.    J. R. GOMERSALL ET AL    2,288,699
AUTOMATIC ELECTRIC TOASTER
Filed Aug. 2, 1940    4 Sheets-Sheet 1
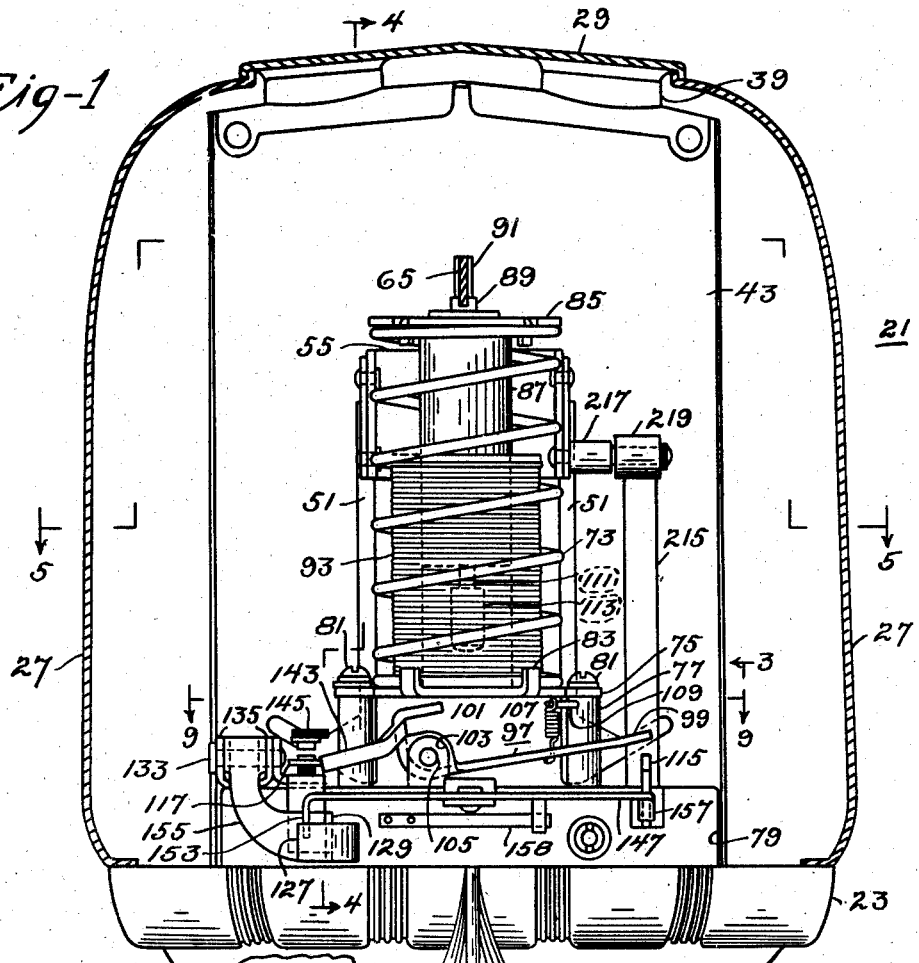
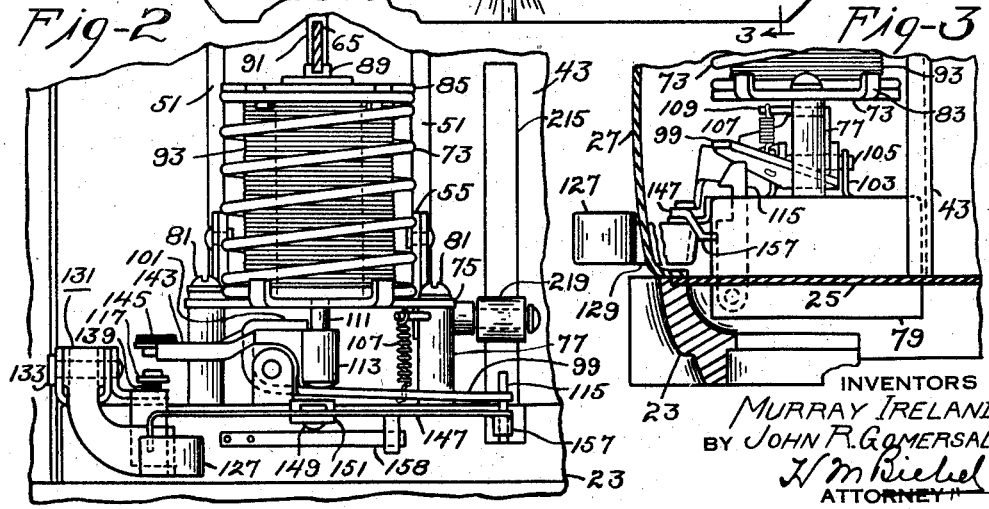
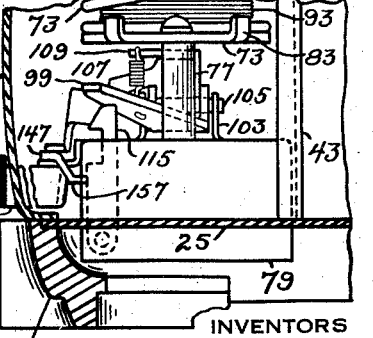
INVENTORS
MURRAY IRELAND
BY JOHN R. GOMERSALL
ATTORNEY

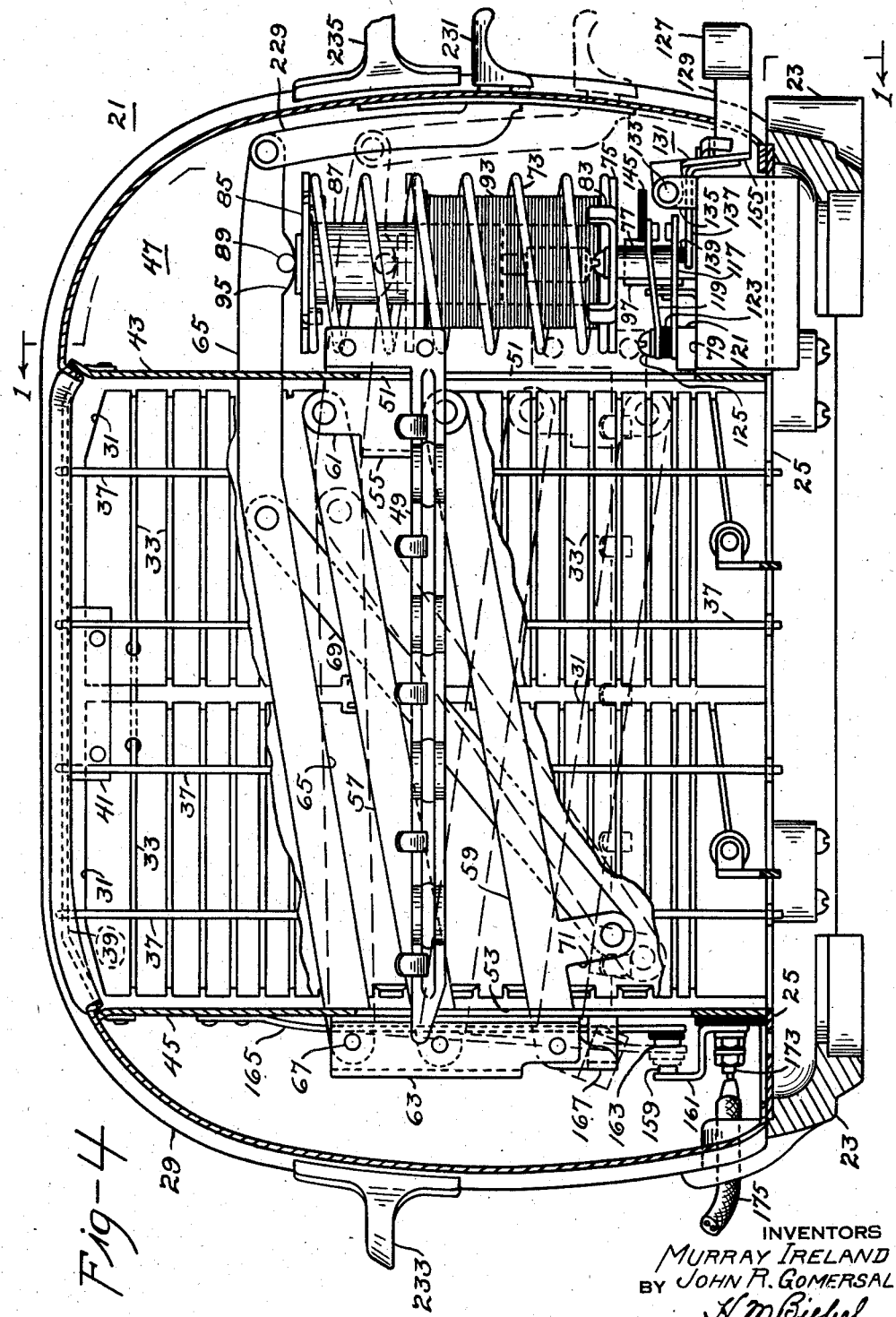

July 7, 1942.  J. R. GOMERSALL ET AL  2,288,699
AUTOMATIC ELECTRIC TOASTER
Filed Aug. 2, 1940  4 Sheets-Sheet 3
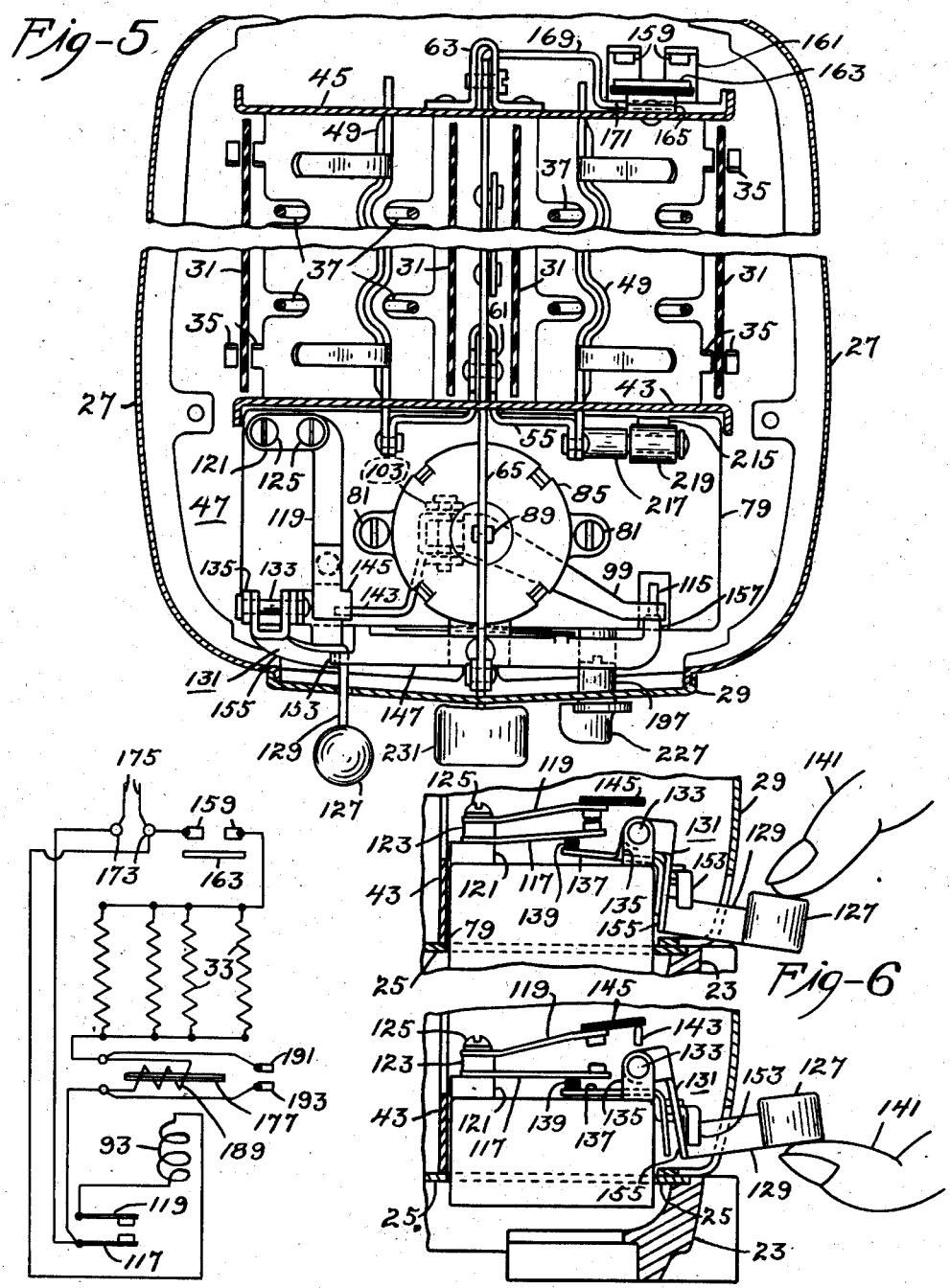
INVENTORS
MURRAY IRELAND
BY JOHN R. GOMERSALL
ATTORNEY

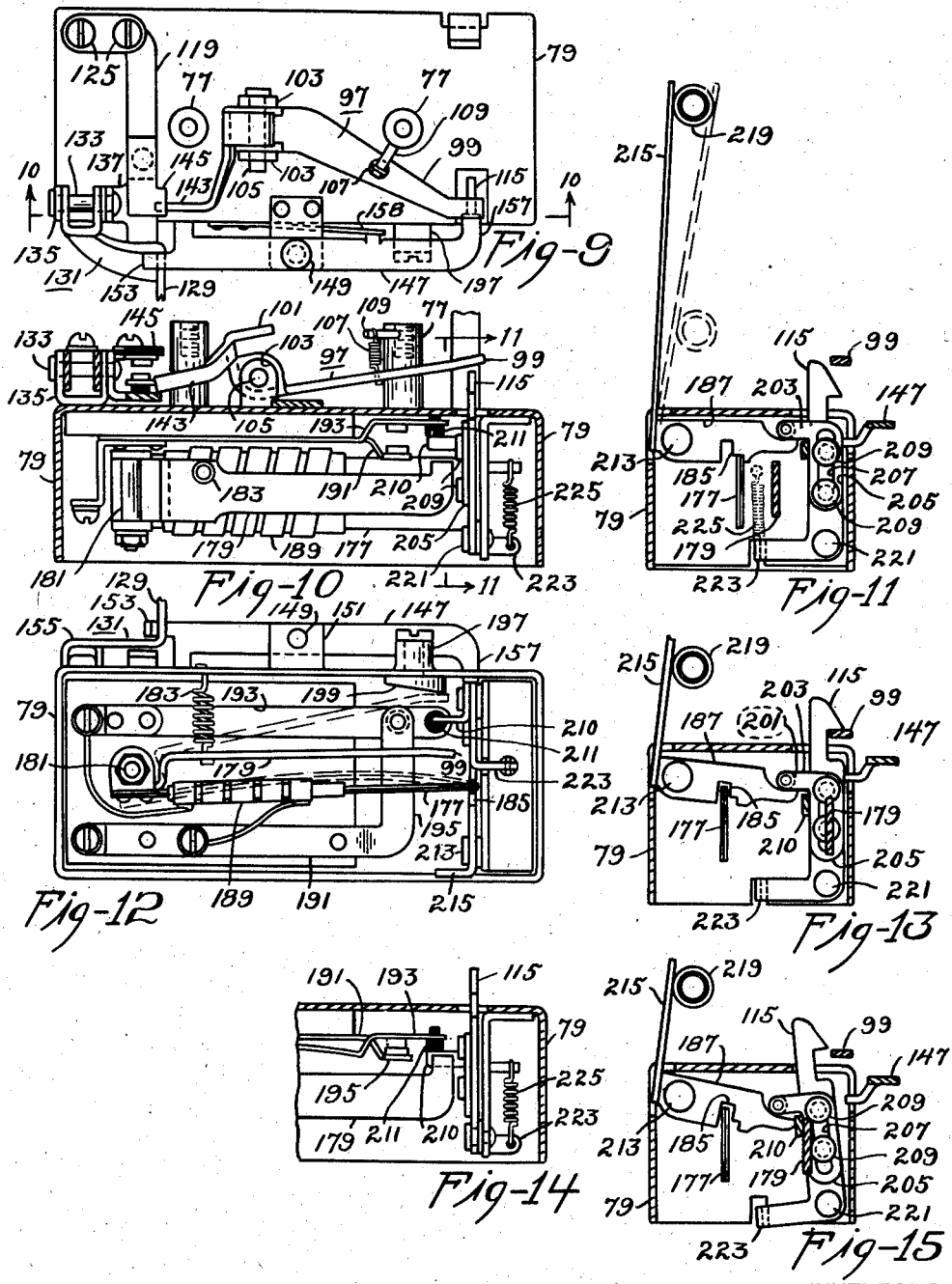

Patented July 7, 1942

2,288,699

UNITED STATES PATENT OFFICE 2,288,699

AUTOMATIC ELECTRIC TOASTER

John R. Gomersall, Minneapolis, Minn., and Murray Ireland, near Elgin, Ill., assignors to McGraw Electric Company, Elgin, Ill., a corporation of Delaware Application August 2, 1940, Serial No. 349,932

12 Claims. (Cl. 219—19)

Our invention relates to toasters and particularly to automatic electric toasters.

An object of our invention is to provide a relatively simple means in an automatic toaster for moving bread slices to be toasted therein into toasting position.

Another object of our invention is to provide a relatively simple construction for a bread slice moving mechanism and timing means for an automatic electric toaster.

Other objects of our invention will either be apparent from a description of one form of our invention as embodied in an automatic electric toaster or will be set forth hereinafter, particularly in the appended claims.

In the drawings:

Figure 1 is a front elevational view of a device embodying our invention taken on the line 1—1 of Fig. 4, Fig. 2 is a fragmentary front elevational view showing parts of the structure in toasting position, Fig. 3 is a fragmentary vertical sectional view taken on the line 3—3 of Fig. 1, Fig. 4 is a view mainly in side elevation but partly in section taken on the line 4—4 of Fig. 1, Fig. 5 is a sectional plan view taken on the line 5—5 of Fig. 1, Fig. 6 is a fragmentary side view partly in section showing parts in certain operating positions, Fig. 7 is a view similar to Fig. 6 showing parts in another operative position, Fig. 8 is a diagram of the electric circuit of the toaster, Fig. 9 is a fragmentary top plan view of certain parts of the structure embodying our invention, Fig. 10 is a view in vertical section taken on the line 10—10 of Fig. 9, Fig. 11 is a vertical sectional view taken on the line 11—11 of Fig. 10 and showing the position of certain parts of the structure under certain operating conditions, Fig. 12 is a bottom plan view of the thermal timer, Fig. 13 is a view similar to Fig. 11 but showing parts thereof in other operating positions, Fig. 14 is a fragmentary sectional view similar to Fig. 10 but showing certain parts thereof in different operating conditions, and, Fig. 15 is a view similar to Fig. 13 but showing parts thereof in other operating positions.

An automatic electric toaster, designated by the numeral 21, includes a skeleton base frame 23 which we now prefer to make of a moulded composition material although our invention is not limited thereto and a skeleton frame of this kind has been shown since it is now used by us in the manufacture of other automatic electric toasters.

A bottom or base plate 25 is secured in any suitable or desired manner against an upper surface portion of the frame 23 and since this forms no part of our invention, no further description of such method of securing is believed necessary.

The toaster structure includes also a three-part casing, namely, two side walls 27 similar to each other and a central and top member 29 which may be of inverted U-shape, all in a manner now well known in the art.

We have elected to illustrate our invention as embodied in a two-slice toaster and in this case we provide four vertically-extending planar heating elements each including one or more sheets 31 of mica on which there is wound a resistor conductor 33. The lower edges of the mica sheets 31 may be supported on the metallic base plate 25 in any suitable or desired manner which will hold these sheets in their desired and proper operative positions and we have shown, in Fig. 5, upwardly-extending pairs of lugs 35 (see Fig. 5) bent out from the base plate 25 to hold the lower edges of the mica sheets 31 in the desired operative positions. The upper edges of the individual sheets of mica may be held in the desired position as by return bent portions of guide or guard wires 37 which interfit with a top frame plate structure 39 and if two sheets of mica 31 are used in each heating element, as shown in Fig. 4 of the drawings, their adjacent upper edges may be connected by a metal or mica plate 41 which may be engaged on one side by the upper end of the main part of the guard wires 37 and which may be engaged on the other side by the above mentioned return bent portion of the guard wires 37, all in a manner well known in the art.

We provide further a front intermediate wall 43 and a rear intermediate wall 45 which cooperate with the outermost heating elements and particularly the sheets 31, the base plate 25 and a part of the casing portion 29 to provide a toasting chamber within the casing hereinbefore described. The front intermediate wall 43 is spaced an appreciable distance from the front wall portions of the casing in order to provide a mechanism chamber 47 within which certain parts of the device embodying our invention are located.

Bread carriers 49 are positioned within the toasting chamber and between pairs of adjacent spaced heating units, these bread carriers being vertically movable in the toasting chamber from their upper non-toasting positions as shown, for instance, in full lines in Fig. 4, to a lower position shown by the broken lines in Fig. 4. Front end portions of each of the bread carriers 49 extend outwardly through slots 51 in the front intermediate wall 43 and rear portions of each carrier extend outwardly through slots 53 in the rear intermediate wall 45. The forwardly-extending portions of the bread carriers 49 are connected through a cross member 55 which is of substantially channel-shape, as shown more particularly in Fig. 5, and is in fact of tubular channel-shape, as will be more clearly pointed out hereinafter. We have illustrated a two-slice toaster structure including four toast-heating elements, but our invention is not limited thereto.

A parallel-motion linkage includes an upper link 57 and a lower link 59 the front ends of which are pivotally connected to a rearwardly-extending return-bent portion 61 of member 55, as shown in Figs. 4 and 5 of the drawings. The rear ends of links 57 and 59 are pivotally connected to a vertically-extending bracket member 63 of substantially channel-shape secured against the rear intermediate wall 45. When the links 57 and 59 are turned in a clockwise direction, member 55 and the bread carriers 49 will move downwardly, the bread carriers remaining in horizontal position.

It may be pointed out that the desired degree of movement of the bread carriers is relatively large, say on the order of two inches or more, and it is desired that any actuating means therefor be constrained to move through a lesser distance. For this purpose we provide an upper pivotally mounted lever arm 65 the rear end of which is pivotally supported on a pin 67 mounted in bracket 63. A link or bar 69 has its upper end pivotally connected to the lever arm 65 intermediate its ends and the lower end is pivotally connected to a short laterally and downwardly extending portion 71 on the lower link 59. We have found that the degree of movement of the front end portion of lever arm 65 with a structure of the kind shown in Fig. 4 of the drawings is much less than that of the movement of the bread carriers 49.

Means for normally holding the bread carriers in their upper, non-toasting positions may include a compression spring 73 the lower end of which is mounted on a supporting plate 75, which plate may be supported by a pair of tubular studs 77 which rest on the upper wall of a casing 79 within which a thermal timer is housed, as will be hereinafter more described in detail. Screws 81 may extend through the studs 77 into the upper wall of the casing. Member 75 may be provided with a plurality of upstanding lugs 83 so located as to hold the spring 73 and particularly the lowermost turn thereof in the desired horizontal position. The upper end of spring 73 supports a disc 85 suitably secured to the spring 73 in such manner that the disc 85 will be maintained in a substantially horizontal position.

The upper end of a magnetizable armature core 87 is mechanically fixedly secured to disc 85 so that when the spring 73 is in its initial, extended, normal position, disc 85 and armature 87 will be in their uppermost positions where the upper end of armature 87 engages with a short pin bearing 89 on arm 65 in order to provide a relatively large area of mechanical contact therebetween to reduce excessive wear which might otherwise occur during operation of the toaster. It may be pointed out that arm 65 is adapted to move vertically in a slot 91 in the front intermediate wall 43 and that an upper edge of the wall stops the upward movement of arm 65 whereby the upper limit of travel of disc 85 and extension of spring 73 is limited.

We provide an electromagnet coil 93 which is also supported on member 75 and which surrounds armature core 87, it being noticed that when spring 73 is in its extended position, as shown in Figs. 1 and 4 of the drawings, the armature 87 will be in its upper position and will be caused to move downwardly when the coil of electromagnet 93 is energized, as will be hereinafter described in detail. We wish to point out here in particular that we provide no mechanical fastening or securing means between arm 65 and disc 85 or armature 87 but merely rest the lower edge of an arcuate surface 95 of arm 65 and the bearing member 89 on the upper end of armature core 87.

As it is desired to cause compression of spring 73 by downward movement of armature 87 when the same is magnetically energized by coil 93 and to then hold the spring in compressed position, we provide a latch member 97 shown more particularly in Figs. 1 and 2 of the drawings, this latch member being of substantially U-shape having a lower long arm 99 and an upper short arm 101 (see Fig. 10). The latch member 97 is pivotally supported as by a pair of upstanding lugs 103 constituting a part of or secured to the upper wall of casing 79. It is thus possible for the latch 97 to have turning movement on a pivot pin 105 carried by brackets 103 and since it is desired to maintain the latch 97 in a predetermined inoperative position, it is biased in a counterclockwise direction by a small spring 107 connected to arm 99 and to a pin 109 mounted in one of the tubular studs 77. The armature 87 has an intermediate lower end portion 111 of relatively small diameter and a larger lower end portion 113 of slightly larger outer diameter than the part 111. When the armature is moved downwardly from the position occupied by it as shown in Fig. 1, the lower end of portion 113 will engage the upper surface of arm 99 near the pivot pin 105 and cause it to turn in a clockwise direction so that the outer end of arm 101 of the latch will be moved over the upper end of portion 113, all as shown in Fig. 2 of the drawings. A pivotally mounted detent arm 115 having an upper hook-shaped end (see Fig. 3) is adapted to be engaged by the outer end of arm 99 of the latch, which latch will therefore be held in the position shown in Fig. 2 of the drawings to thereby hold the armature 87 in its lowered position, the spring 73 being held in its compressed shape, as shown in Fig. 2. During this movement of the armature 87 in a downwardly direction it will, of course, be obvious that arm 65 and particularly its forward end also moved downwardly since, in effect, the supporting means normally holding it in its upper position was removed, or to state it slightly differently, was suddenly lowered.

Means for effecting energization of the coil of electromagnet 93 includes a lower resilient contact arm 117 and a cooperating upper resilient contact arm 119 which may be supported on a block 121 of electric insulating material, a washer 123 of electric insulating material being positioned therebetween as shown more particularly in Figs. 6 and 7 of the drawings. Any suitable means such as machine screws 125 may be employed to hold the two contact arms in proper operative position with their free ends normally spaced from each other, as shown in Fig. 4 of the drawings. A push button 127 is mounted on the front end of an arm 129 of an actuating lever arm designated generally by 131, which lever arm is pivotally mounted on a pivot pin 133 supported by one or more lugs 135 mounted on the upper wall of casing 79. Lever arm 131 is provided with a portion 137 extending rearwardly of its pivotal supporting pin 133 and a small lug 139 of electric-insulating material is mounted adjacent the rear end thereof so that upon downward pressure as by the finger 141 of an operator, as shown in Fig. 6, lug 139 will engage contact arm 117 and move it upwardly into engagement with contact arm 119 whereby a circuit is closed through the coil of electromagnet 93 energizing the same with resultant energization of the armature core 87 and its quick downward movement into the position shown in Fig. 2 of the drawings where the armature core will be held by the latch 97 as has been hereinbefore described. The bread carrier will, of course, also have moved downwardly due to the action of gravity thereon and it may be here further pointed out that the parallel-motion linkage structure hereinbefore described is so designed, constructed and adjusted that it will embody relatively small friction only of the relatively movable parts so that its downward movement will follow that of the downward movement of armature 87.

It is, of course, desirable to cause opening of the magnet coil energizing circuit as soon as such energization is no longer necessary, that is, when the armature has been moved to its lowermost position and held therein as shown in Fig. 2 of the drawings. For this purpose latch 97 is provided with an auxiliary arm 143 so positioned as to be engageable with a small plate 145 of electric-insulating material secured to the front end portion of upper resilient contact arm 119. As shown in Fig. 7 of the drawings, when armature 87 has been moved downwardly as hereinbefore described, the outer end of auxiliary arm 143 will have been moved upwardly into substantially the position shown in Fig. 7 of the drawings when it will have engaged member 145 and have caused it and contact arm 119 to move upwardly out of engagement with contact arm 117, to thereby open the magnet coil energizing circuit which was established when the two contact arms 117 and 119 were initially caused to engage each other, as shown in Fig. 6, by downward pressure on button 127. It is, of course, to be understood that the two resilient cooperating contact arms are so designed, constructed and adjusted that normally they are out of engagement with each other as shown in Fig. 4 of the drawings, that downward pressure on knob 127 will cause them to engage as shown in Fig. 6 of the drawings, and that downward movement of armature 87 into engagement with latch 97 will result in disengagement of the two contact arms as shown in Fig. 7 of the drawings. It will, therefore, be evident that even if an operator using the toaster should continue pressing on knob 127 beyond the time necessary to cause the hereinbefore described action of the armature core and of the bread carrier, no harm will result since the circuit through the electromagnet is immediately opened coincident with the movement of the armature 87 into holding position with latch 97. It is thus evident that the electromagnet coil 93 may be made of relatively small size since it is energized only at the initiation of a toasting operation and then for a relatively very short time only.

As it may be considered desirable for an operator to effect quick manual return of the bread carrier to its upper or non-toasting position during a toasting operation, we provide a lever arm 147 in front of the front wall of casing 79 which lever arm is pivotally mounted at 149 intermediate its ends as on a bracket 151 mounted on a part of casing 79. The left-hand end portion of member 147 is provided with a downwardly-extending lug 153 which is normally positioned in front of an intermediate portion 155 of member 131 so that upward movement by the finger of an operator, as shown in Fig. 7, will cause forward movement of the left-hand end portion of arm 147 with rearward movement of the right-hand end portion 157 of member 147 against an intermediate portion of detent 115 to thereby cause movement thereof in a clockwise direction, as seen in Fig. 3, so that it will disengage the end portion of arm 99 of the latch member 97 from detent arm 115 with resultant quick upward movement of armature 87 because of the spring 73 which will return, under these conditions, from the position shown in Fig. 2 to its extended position as shown in Fig. 4, with accompanying turning movement of lever arm 65 in a counter-clockwise direction and upward vertical movement of the bread carrier or carriers 49. It is, of course, to be understood that this manually initiated upward movement of the carrier 49 is entirely distinct from that which is caused by the timing means to be hereinafter described in detail. A small leaf spring 158 normally biases the lever arm 147 into such a position that end portion 157 will be out of engagement with detent 115.

Since it is desired that the main heating elements comprising particularly the set of heating resistors 33 be energized only during a toasting operation we provide a main heater-control switch comprising a pair of fixedly mounted contact members 159 which may be supported by brackets 161 which are insulatedly mounted on the rear intermediate wall 45, as shown more particularly in Figs. 4 and 5 of the drawings. The connection of these fixed contact members is shown in Fig. 8 of the drawings. A contact bridging member 163 is insulatedly supported on a resilient bar 165 which has its upper end secured to the rear wall 45 (see Fig. 4), the arm 165 being so bent that it is biased to the position shown in the full lines in Fig. 4 of the drawings where the bridging member 163 would be out of circuit-closing engagement with contact members 159.

The lowermost arm 59 of the parallel-motion linkage is provided with a depending extension 167 to which there is secured a horizontally-extending arm 169 (see Fig. 5) which arm has a part 171 thereof extending back of the lower end portion of arm 165. It will be evident that when link arm 59 is turned in a clockwise direction, as hereinbefore described, to cause movement of the bread carrier into toasting position, the portion 171 of arm 169 normally positioned closely against the outer surface of intermediate wall 45 will be angularly moved away therefrom to cause movement of the lower portion of arm 165 away from wall 45 so that contact bridging member 163 will be moved into engagement with contacts 159 as shown by broken lines in Fig. 4 to thereby close the energizing circuit through the toast-heating elements.

A plurality of terminal members 173, only one of which is visible in Fig. 4 of the drawings, may be insulatedly mounted on the rear wall 45 and have permanently connected therewith a twin conductor cord 175 in a manner well known in the art. It is to be understood that members 39 as well as the top part of casing portion 29 are provided with longitudinally-extending slots therein for the insertion of slices of bread into the toasting chamber and for the removal of toasted slices of bread, all in a manner well known in the art.

A thermal timing means operating on the heat-up cool-off principle during a toasting operation includes a bimetal bar 177 which has mechanically secured thereto at one end thereof, a relatively rigid bar 179, these two bars being pivotally mounted on a fixed pivot pin 181 as shown more particularly in Figs. 10 and 12 of the drawings. It will be noted that the rigid bar 179 is provided with a laterally off-set portion near the pivot pin 181. The substantially U-shaped structure comprising the bimetal bar 177 and the rigid bar 179 is normally yieldingly biased in a counter-clockwise direction, as seen in Fig. 12 of the drawings, by a small spring 183 having one end secured to bar 179 and the other end thereof secured to the outer or front wall of casing 79. The upper edge portion of bimetal bar 177 normally engages one side wall of a shouldered recess 185 in a pivotally-mounted arm 187 as shown more particularly in Fig. 11 of the drawings. Spring 183 is not shown in Fig. 11 of the drawings but it is evident that the action of the biasing spring 183 is to move the free or movable ends of bars 179 and 177 in the right-hand direction as seen in Fig. 11 of the drawings. This will have the result that the upper edge of bimetal bar 177 will engage the right-hand shouldered edge of recess 185, as is clearly shown in Fig. 11.

We provide further a small auxiliary electric heating element 189 which is insulatedly mounted on and supported by the bimetal bar 177 to move therewith. The two ends of the auxiliary heater 189 are connected respectively to two normally spaced apart contact bars 191 and 193. Bar 191 has a lateral extension 195 thereon the outer end of which extends to such a position that it will be beneath an outer end portion of contact arm 193. As will be seen from Fig. 8 of the drawings, when the main toast-heating resistors 33 are first energized, as has already been hereinbefore described, current will also flow through the auxiliary heater 189 which auxiliary heater will also be heated and cause heating of the bimetal bar 177. Since the bimetal bar 177 is initially pivotally supported at both its ends, it cannot move bodily but the design and construction is such that it will bow forwardly or towards the front part of the toaster structure as is shown in the broken lines in Fig. 12 of the drawings. This bowing of the bar with resultant turning movement of the left-hand end of the bimetal bar (as seen in Fig. 12) will cause turning movement in a counter-clockwise direction, in Fig. 12, of rigid bar 179, which will continue until the movable end of the bar 179 engages a particular point on a manually-adjustable stop member 197 having a cam surface 199 thereon, as shown more particularly in Fig. 12 of the drawings. The position of bar 179 when it has been turned enough to cause it to engage the cam surface 199 is shown by the broken lines in Fig. 12 of the drawings.

When this engagement of the movable end of bar 179 with cam surface 199 occurs, the bimetal bar 177 will have been heated to a predetermined relatively high temperature and the next step in the operation will be that the movable end of bar 177 will move in a left-hand direction, as seen in Figs. 11 and 13, so that the upper edge of bimetal bar 177 may enter the deeper portion of shouldered recess 185, as is shown more particularly in Fig. 13. Bar 187 is biased in a clockwise direction, as seen in Figs. 11 and 13, by reason of its being engaged by a pin 201 on a lateral extension 203 on a bar 205 of substantially L-shape, which is secured against one face of latch member 115. The vertically-extending portion of bar 205 is provided with an elongated slot 207 in which guide and supporting pins 209 are adapted to enter and fit. These pins are secured in detent member 115. The horizontally-extending portion 203 of member 205 is provided with a laterally-extending projection 210 which extends under the extreme outer end of contact bar 193, which latter is provided with a lug 211 of electric-insulating material to normally engage projection 210 to bias it in a given direction, namely in the direction to cause downward movement of projection 210 and bar 205.

Member 187 is pivotally mounted on a pivot pin 213 and has an upwardly extending arm 215 thereon which arm is normally adapted to be positioned relatively closely adjacent to the front intermediate wall 43. The front portion of the right-hand bread carrier 49 is provided with a laterally-extending stub shaft 217 having a roller 219 thereon which roller is positioned in front of arm or bar 215 to cause certain movements thereof.

Referring now to Figs. 13 and 14 of the drawings, it will be noted, particularly from Fig. 13 of the drawings, that arm 187 has been caused to turn slightly in a clockwise direction which has permitted or caused downward movement of the contact arm 193 so that it has moved into engagement with the portion 195 of the other contact arm 191, the result of this contacting engagement being short-circuiting of the auxiliary electric heater 189 and deenergization thereof with resultant cooling of the bimetal bar 177. This occurred when bimetal strip 177 moved into the deeper portion of recess 185, as hereinbefore described.

It will be noted that the bimetal bar 177 has its outer movable end now positioned in the deeper part of recess 185 in member 187 so that it is prevented from movement in a right-hand direction as seen in Figs. 11, 13 and 15. It has further been hereinbefore set forth that member 210, which is a part of member 205, was moved downwardly from the position shown in Fig. 11 to the position shown in Fig. 13 simultaneously with the downward movement of member 201. This means that lug 210 is in the path of the return movement of the free end of rigid bar 179 and Fig. 14 shows the members 179 and 210 in the positions they will occupy when bimetal bar 177 has cooled enough to force rigid bar 179 to move lug 210, member 205, and detent arm 115 in a counterclockwise position on a supporting pivot pin 221.

Reference particularly to Fig. 11 of the drawings will indicate that pivot pin 221 is secured to an end wall of casing 79 and that detent arm 115 is provided with a lateral extension 223 which has one end of a small biasing spring 225 secured thereto to normally yieldingly bias detent 115 in a clockwise direction. The inner face of a side wall of the casing 79 may constitute a stop member for arm 115.

Movement of detent arm 115 in a counter-clockwise direction to the position shown in Fig. 15 will cause release of the detent from the latch arm 99 thus making it possible for the latch to turn to the position shown in Fig. 1 of the drawings whereby armature 87 is released from the latch and permitted to move upwardly under the influence of spring 73. When this happens, roller 219 will move upwardly in front of the pivotally mounted bar 215 to cause the upper end of this bar to more closely approach the front surface of the front intermediate wall 43, as shown particularly in Fig. 11 of the drawings, which turning movement of bar 215 causes turning movement of bar 187 and a return of the various parts of the timer structure to their original initial positions ready for another operation.

If it is desired to vary the duration of a toasting operation, this can be done by turning a knob 227 which is mounted on shaft 197 outside of the toaster casing. If cam surface 199 is caused to turn by turning movement of knob 227 so that it occupies the position shown in Fig. 12 of the drawings, it is obvious that the temperature of the bimetal member 177 required to cause contacting engagement of the movable end of the rigid bar 179 with the cam face 199 will be lower than would be necessary if the cam face were turned so that that portion now shown at the left-hand side of the cam face in Fig. 12 would be engageable by the rigid bar 179.

As it may be desired by an operator to inspect the toasting operation or the progress of the toasting of one or more slices of bread, we provide relatively simple means connected with the main lever arm 65 which will permit of raising the bread carriers to a position where the upper edge of a slice of bread will be above the top of the casing without affecting any of the parts of the thermal timing means. For this purpose we provide a short arm 229 (see Fig. 4) the upper end of which is connected pivotally to the extreme front end of arm 65. The lower end of arm 229 extends laterally thereof and outwardly through a slot in the front wall of the casing and has mounted thereon a lifting knob 231. The lifting knob 231 is shown in both its upper and in its lower positions in Fig. 4 of the drawings, the upper position being that occupied by it when the bread carrier is in the non-toasting position and the lower position, shown in broken lines, being that occupied by it when the bread carrier is in its lowered or toasting position. It is only necessary for an operator to place his finger under the knob 231 and raise it a relatively small distance to permit of visual inspection of the condition of a slice or slices of bread being toasted.

A plurality of lifting knobs 233 and 235 may be secured to the rear and the front portions of the casing to permit of carrying the same in a manner well known in the art.

We wish to point out as one of the novel elements in our structure that an electromagnetic armature supports the bread carrier in its uppermost position and that it may be drawn down electromagnetically against the action of a compression spring and latched in a lower position. The bread carrier follows the armature by gravity and is not held fixedly latched in its toasting position. There is no mechanical fastening means and therefore no constraint between the bread carrier and particularly the main lever thereof and the detent.

We wish to further point out that our improved control structure provides a manually closable switch to initiate a toasting operation, which switch is moved automatically and independently of the manual control to open position to deenergize the electromagnet which was energized by the manual closing of this auxiliary switch when the desired result has been attained. At has already been hereinbefore stated, this saves electric energy and also overcomes the possibility of trouble of the electromagnet coil which might be caused by long continued current flow therethrough as might happen if the operator forgot to remove the pressure from the control knob.

While we have illustrated and described a specific embodiment of our invention, it is obvious that changes and modifications therein may be made and all such modifications and variations as clearly come within the scope of the appended claims are to be considered as being covered thereby.

We claim as our invention:

1. In an automatic electric toaster the combination with heating means and a vertically reciprocal bread carrier movable into toasting and non-toasting positions relative to said heating means, of spring means free of attachment with the carrier supporting the carrier in non-toasting position and being compressible to effect lowering of the carrier to toasting position, electromagnetic motor means for compressing the spring means and a control switch therefor, locking means for securing the spring in compressed condition to maintain the carrier in toasting position, a manual control member operable to close the electromagnetic motor means switch to energize said motor means, means responsive to movement of the carrier to toasting position and operable independently of the position of said manual control member to open said switch and deenergize said motor means, timing means for releasing said locking means at the end of a toasting operation to cause the spring means to return the carrier to non-toasting position, means including said manual control member of the motor means switch for interrupting the toasting operation operable independently of the timing means to release the locking means and cause the spring means to return the carrier to non-toasting position, and means for manually returning the carrier to non-toasting position during the course of a toasting operation operable independently of the timing means and locking means while the spring means is secured in compressed condition.

2. In an automatic electric toaster the combination with heating means and a vertically reciprocal bread carrier movable into toasting and non-toasting positions relative to said heating means, of spring means biasing the carrier in non-toasting position, electromagnetic motor means for moving the carrier to toasting position, releasable means for maintaining the carrier in toasting position, a control switch for energizing and deenergizing said motor means comprising a pair of opposing movable contact arms, a manually operated member for closing the switch to energize the motor means operative to move one of the movable switch contact arms into engagement with the second contact arm, and means for opening the switch to deenergize the motor means operative in response to movement of the carrier to toasting position independently of the manually operated member to move the second contact arm away from engaging position with the first contact arm.

3. In an automatic electric toaster the combination with heating means and a vertically reciprocal bread carrier movable into toasting and non-toasting positions relative to said heating means, of spring means biasing the carrier in non-toasting position, electromagnetic motor means for moving the carrier to toasting position and a control switch therefor, releasable means for maintaining the carrier in toasting position, a manually operated member operable to close said switch for energizing the motor means, and being also operable when the carrier is in toasting position to release said releasable means to cause the spring means to move the carrier to non-toasting position.

4. In an automatic electric toaster the combination with heating means and a vertically reciprocal bread carrier movable into toasting and non-toasting positions relative to said heating means, of spring means biasing the carrier in non-toasting position, electromagnetic motor means for moving the carrier to toasting position and a control switch therefor, locking means for maintaining the carrier in toasting position, means for releasing said locking means, a manually operated member movable in one direction to close the electromagnetic motor means switch and being movable in the opposite direction to actuate said means for releasing the locking means.

5. In an automatic electric toaster the combination with heating means and a vertically reciprocal bread carrier movable into toasting and non-toasting positions relative to said heating means, of spring means biasing the carrier in non-toasting position, electromagnetic motor means for moving the carrier to non-toasting position and a control switch therefor, releasable locking means for maintaining the carrier in toasting position, a manually operated member movable in one direction to close said switch and energize the motor means to move the carrier to toasting position, means responsive to movement of the carrier to toasting position operable independently of the manually operated member to open the motor means switch, and means actuatable by movement of the manually operated member in the opposite direction for releasing said locking means to effect return of the carrier to non-toasting position.

6. In an automatic electric toaster of the class including a toaster chamber, toast heating means therein, a bread carrier in the toasting chamber reciprocally vertically movable in the toasting chamber into toasting and non-toasting positions therein and a lever arm connected to the said bread carrier and extending outwardly beyond the toasting chamber for manual operation of the said bread carrier; the improvement comprising an electromagnetic coil, an armature axially movable in and out of the said electromagnetic coil, a compressible coil spring surrounding the said electromagnetic coil, the said compressible spring fixedly mounted at the lower end of the said electromagnetic coil and the upper end of the said compressible spring operably engaging the upper end of the said armature in such a manner as to normally hold the upper end of the said armature in a position out of the said electromagnetic coil and the said electromagnetic coil supporting the said bread carrier, an upper resilient switch arm, a lower resilient switch arm and the said upper and lower switch arms for controlling the circuit of the said electromagnetic coil and the said switch arms normally breaking the circuit of the said electromagnetic coil, a manually operable arm for actuating the lower resilient switch arm in such a manner that the said lower resilient switch arm will contact the upper resilient switch arm so as to close the circuit of the said electromagnetic coil, whereby the said armature will be actuated axially downwardly into the said electromagnetic coil causing compressive movement of the said compression spring, a pivotally mounted latch member, a tension spring normally holding the said pivotally mounted latch member in a disengaging relationship, a spring tensioned catch member, a detent mounted at the lower end of the said armature, a locking part mounted on the said latch member whereby upon the downward axial movement of the said armature the detent aforesaid will engage the said latch member in such a manner as to pivot the said latch member so that the said locking part aforesaid mounted on the said latch member will lockingly engage the said detent and one end of the said pivoted latch member will actuate the upper resilient switch arm aforesaid in such a manner as to break the circuit of the said electromagnetic coil and the other end of the said pivoted latch member will be locked by the aforesaid spring tensioned catch member, thereby locking the said armature in lowered position and the said bread carrier resting in toasting position upon the upper end of the said lowered armature, and operable means for actuating the said spring tensioned catch member so as to release the said armature, whereby the armature under compression of the said armature compression spring will move upward axially out of the said electromagnetic coil, thereby carrying the said bread carrier to non-toasting position.

7. In an automatic electric toaster of the class including a toaster chamber, toast heating means therein, a bread carrier in the toasting chamber reciprocally movable in the toasting chamber into toasting and non-toasting position therein, an electromagnet and an armature adapted for actuation by the said electromagnet to move the said bread carrier, and a switch for controlling the circuit of the said electromagnet; the improvement comprising a pivotal latch member, and a first part mounted on the said latch member adapted to lock the said armature, and a second part provided on the said latch member adapted to actuate the said switch, and the armature aforesaid adapted upon the energization of the said electromagnet to engage the said latch member so as to pivot the said latch member in such a manner as to cause the said first part of the said latch member to lock the said armature and to cause the said second part of the said latch member to actuate the said switch in such a manner as to break the circuit of the said electromagnet.

8. In an automatic electric toaster of the type comprising a toast heating means, a bread carrier vertically reciprocally movable into toasting and non-toasting positions relatively to said toast heating means, a magnet coil and an armature, a tension spring normally holding the said bread carrier in its upper non-toasting position, the said magnet coil effective on energization of the said coil to cause the downward movement of the said armature, tensioning the said spring and downward movement of the said bread carrier to toasting position, a normally open switch for controlling the energization of the said magnet coil, and manual means for closing the said switch; the improvement comprising a latch member engageable by the said armature for holding the said armature in its lowered position and means actuable by the said latch member for causing opening of the said switch when the latch member is engaged by the said armature.

9. In an automatic electric toaster of the type comprising a toast heating means, a bread carrier vertically reciprocally movable into toasting and non-toasting positions relatively to said toast heating means, a magnet coil and an armature, a tension spring normally holding the said bread carrier in its upper non-toasting position, the said magnet coil effective on energization of the said coil to cause the downward movement of the said armature, tensioning the said spring and downward movement of the said bread carrier to toasting position, a normally open switch for controlling the energization of the said magnet coil, and manual means for closing the said switch; the improvement comprising a pivotal latch member pivoted into armature-holding position by the downward movement of the said armature and effective to hold the said tension spring in tensioned position, means for causing opening of the said switch by said pivotal latch member when it is pivoted into armature-holding position and a timer for causing release movement of said latch member after a time interval.

10. In an automatic electric toaster of the type comprising a toaster chamber, toast heating means therein, a bread carrier in the toasting chamber reciprocally movable in the toasting chamber into toasting and non-toasting position therein; the improvement comprising a coil magnet, an armature supporting the said bread carrier and the said armature slidably mounted within the said coil magnet, an expansion spring mounted on the said coil magnet and operatively connected at one end to the slidably mounted armature in such a manner as to normally hold the upper end of the said armature out of the said coil magnet with the said bread carrier resting upon the said armature, locking means provided at the other end of the said armature whereby upon downward axial movement of the said armature upon energization of the said coil magnet, the said armature is locked at the said other end with the said bread carrier being supported by the said armature in the said lowered position and the said expansion spring being held by the said locked armature against effecting upward movement of the said bread carrier and operable means whereby the said locking means may be released.

11. In an automatic electric toaster of the type comprising a toaster chamber, toast heating means therein, a bread carrier in the toasting chamber reciprocally movable in the toasting chamber into toasting and non-toasting position therein; the improvement comprising a coil magnet, an armature supporting the said bread carrier, and the said armature axially movable relative to the said magnet, tension means mounted on the said coil magnet and operatively connected at one end to the said armature, means for locking the said tension means in an inoperative position, the said locking means operative upon energization of the said coil magnet causing axial movement of the said armature relative to the said coil magnet moving the said bread carrier from a first position to a second position, and means for releasing the said tension means in such a manner as to cause the said tension means to move the said armature relative to the said coil magnet and thereby returning the said bread carrier from the said second position to the said first position.

12. In an automatic electric toaster of the type comprising a toaster chamber, toast heating means therein, a bread carrier in the toasting chamber reciprocally movable in the toasting chamber into toasting and non-toasting position therein; the improvement comprising a coil magnet, an armature supporting the said bread carrier and the said armature reciprocally movable axially within the said coil magnet, a coil compression spring surrounding the said coil magnet and the said coil compression spring affixed at the lower end to the said coil magnet, a disc mounted at the upper end of the said armature, and the said coil spring operatively engaging the said disc at the upper end thereof, a detent part mounted at the lower end of the said armature, and a latch member adapted to engage the said detent part upon the downward axial movement of the said armature upon energization of the said coil magnet, the said movement of the said armature causing thereby the compression of the said coil spring, and the said armature thereby carrying the said bread carrier to a toasting position, and means for actuating the said latch member for the release of the said detent part upon the elapse of a predetermined time period for returning the said bread carrier to a non-toasting position.

JOHN R. GOMERSALL.
MURRAY IRELAND.